United States Patent [19]

Coenenberg et al.

[11] 4,166,349

[45] Sep. 4, 1979

[54] SENSING DEVICE FOR GUIDING A HARVEST MACHINE

[75] Inventors: Hans-Helmut Coenenberg, Bielefeld; Helmut Homburg; Horst Ziems, both of Harsewinkel, all of Fed. Rep. of Germany

[73] Assignee: Firma Gebr. Claas Maschinenfabrik GmbH, Harsewinkel, Fed. Rep. of Germany

[21] Appl. No.: 857,840

[22] Filed: Dec. 5, 1977

[30] Foreign Application Priority Data

Feb. 10, 1977 [DE] Fed. Rep. of Germany ....... 2705491

[51] Int. Cl.$^2$ ............................................. A01D 75/14
[52] U.S. Cl. ................................ 56/10.2; 56/DIG. 15
[58] Field of Search ......................... 56/10.2, DIG. 15; 180/79.1

[56] References Cited

U.S. PATENT DOCUMENTS

| | | | |
|---|---|---|---|
| 2,929,457 | 3/1960 | Langerak | 56/DIG. 15 |
| 3,797,208 | 3/1974 | Strubbe | 56/10.2 |
| 3,991,618 | 11/1976 | Stampfer et al. | 56/DIG. 15 |

FOREIGN PATENT DOCUMENTS 2145717 3/1973 Fed. Rep. of Germany ............ 56/10.2

*Primary Examiner*—Jay N. Eskovitz
*Attorney, Agent, or Firm*—Pollock, VandeSande and Priddy

[57] ABSTRACT

A self-propelled harvesting machine of the type having an automatic steering system is provided with a pair of feelers extending toward one another from the facing surfaces of a pair of plant row dividers located at the forward end of the machine. Each feeler is mounted for motion within the casing of one of the dividers in cooperation with a magnetic transducer located within that casing, and extends from the interior of the casing through an elongated slot in the side wall of the casing. The external portion of each feeler extends in a rearward direction relative to the side wall of the casing and has a comparatively shallow convex arcuate configuration terminating at a free end of the feeler which is located to the rear of the rearward end of the slot. The end of each feeler located within the divider casing includes a pivotal mounting, a cam, and associated abutments so arranged that the feeler can move in a forward direction from a predetermined neutral position to avoid damage to the feeler and its associated transducer during servicing operations or if the direction of motion of the harvesting machine is reversed.

15 Claims, 5 Drawing Figures

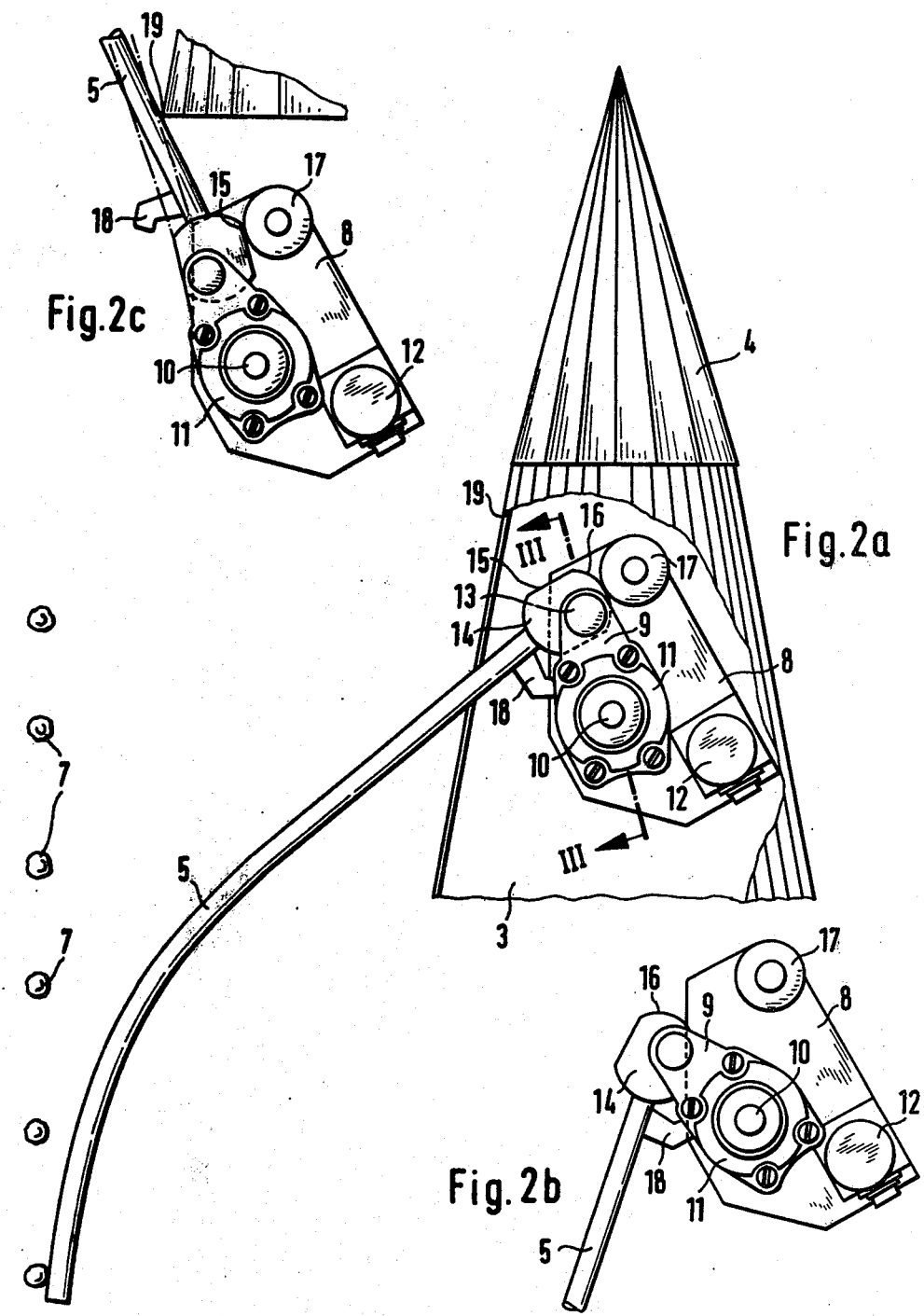

SENSING DEVICE FOR GUIDING A HARVEST MACHINE

BACKGROUND OF THE INVENTION

The present invention is concerned with an improved sensing device for automatically guiding a self-propelled harvesting machine along a plant row, or along an analogous reference line, during a harvesting operation; and is more particularly concerned with an improved sensing device which is adapted to be mounted on the plant row divider structure which forms a portion of the harvesting mechanism at the front end of the machine, and which cooperates with a transducer responsive to movement or deflection of the feeler as it engages plants in a row to generate a control signal for the automatic steering system of the harvester.

In one known arrangement of the general type described above, feelers have been provided which are mounted externally of the divider points of the plant harvesting mechanism. A securing link is provided at the front and to one side of the divider for each feeler; and the feelers, although angled to provide sufficient spacing from their respective divider points, are each formed as substantially straight elements which extend rearwardly in generally parallel relation to the side walls of their respective divider points. The rearward end of each feeler is supported on its respective divider by a spring, and is connected to this location to an electric switching device for control of the automatic steering system of the harvester.

In this known arrangement, the feelers mounted on the sides of the dividers are adapted to sense a row of plants from both sides thereof, but the arrangement is such that each feeler is adapted to contact only a single stalk in the row at any given time so that the feelers, during a control operation, must jump from stalk to stalk. As a result, a regular jerking of the automatic steering system on the harvester occurs. Furthermore, this known arrangement exhibits the disadvantage that, due to the fact that all connections to the feeler are external of its associated divider point, proper operation of the feeler and of the coupling elements and electrical switch members associated therewith, is often impaired by portions of plants, or lumps of earth or stones, which tend to lie between the feelers and divider points or which cause mechanical damage to the exposed elements. The link connections on the feelers in this exposed arrangement are, moreover, subject to continual wear, which gives rise to problems of maintenance and repair; reverse operation of the harvester causes additional problems since plants tend to be caught in the region behind the outer ends of the feelers, which cannot correspondingly yield; and, in addition, the relay control used in this known sensing device requires a large amount of space within the divider point.

An alternative sensing device has been suggested heretofore which is intended to eliminate some of the defects noted above. In this alternative device, the feelers are carried rigidly on an arm which extends forwardly, in the direction of travel of the harvester, beyond the cutting elements of the harvesting machine. The feelers employed are secured at the front end of this arm, and extend rearwardly in a shallow arc so that they contact simultaneously at least two stalks in a given plant row. A flexible strip measuring element, which converts bending of the feeler into an electrical signal, is situated on the feeler near its point of attachment to the arm. This arrangement also exhibits a number of disadvantages. It is, for example, subject to heavy mechanical stress, especially at high speed, which requires that the flexible measuring element employed be situated on the unfavorable sensing side of the feeler. Moreover, the problem of reversing motion of the harvester machine remains unsolved, since there is the danger that the rigidly secured feelers in this type of sensing device will be bent when the harvester is moved in a reverse direction.

The present invention is intended to obviate all of these problems by provision of a sensing device of the type first mentioned, i.e., wherein the feelers are mounted on the divider points of the harvester mechanism, but wherein the feelers are mounted in a protected arrangement and are so coupled with associated transducers that the individual mechanical influences resulting from resistance to motion are effective only at the free ends of the feeler which, in turn, is adapted to yield pivotally.

SUMMARY OF THE INVENTION

The improved sensing device of the present invention comprises one or more feelers which are mounted on the divider points of a harvesting machine, with the mounted end of each feeler being located within the casing of an associated divider point. The transducer for each feeler is also located within said casing, and the feeler extends from the interior to the exterior of the casing via an elongated slot in the side wall of the casing and then extends in a rearward direction in a comparatively shallow convex arcuate configuration to provide a free end of the feeler which is unattached to the casing and which is located rearwardly of the rear end of the elongated slot through which the feeler protrudes. By this arrangement, the location at which the feeler is connected to its associated divider point, the transducer, and the mechanical elements which interconnect the feeler to said transducer, are all situated within the casing of the divider so that the arrangement avoids projections on the divider which might lead to a buildup of weeds, leaves, earth and the like. Moreover, it has been found that the elongated slots in the side wall of the divider point through which the feelers protrude, particularly if they are directed in an obliquely downward direction, do not become blocked by foreign materials since movement of the feeler along the slot achieves a self-cleaning operation, thereby totally avoiding jamming of the feeler.

The interior end of each feeler is pivotally mounted on a hub member which is in turn pivotally mounted on a supporting structure; and these portions of the device are further associated with an eccentric cam which is movable with the interior end of the feeler on an abutment carried by a supporting structure within the divider point and which cooperates with a spring element for normally biasing the hub and feeler into a predetermined neutral position. A lug extends from the feeler toward the hub for separable engagement with the hub so that the hub and feeler may pivot together as a unit when the feeler is deflected in a rearward direction, the extent of such rearward deflection of the feeler being limited by engagement of the external free end of the feeler with the side wall of its associated divider casing. The arrangement is such, moreover, that if the harvester should be moved in a reverse direction, the feeler can deflect in a forward direction about its pivot point on the aforementioned hub, to an extent determined by the forwardmost end of the slot in the side wall of the divider casing through which the feeler protrudes, thereby to avoid bending or damage to the feeler or to its associated transducer, or the undesired capture of foreign materials between the feeler and its associated divider point, during such reverse motion of the harvesting machine.

BRIEF DESCRIPTION OF THE DRAWINGS

The foregoing objects, advantages, construction and operation of the present invention will become more readily apparent from the following description and accompanying drawings wherein:

FIGS. 2a, 2b, and 2c are views, in partial section, taken from the bottom of a divider on a maize reaper of the type shown in FIG. 1, illustrating the sensing device in its neutral position (FIG. 2a), in a rearwardly deflected position (FIG. 2b) and in a forward deflected position (FIG. 2c)

DESCRIPTION OF THE PREFERRED EMBODIMENTS

Figure 1:
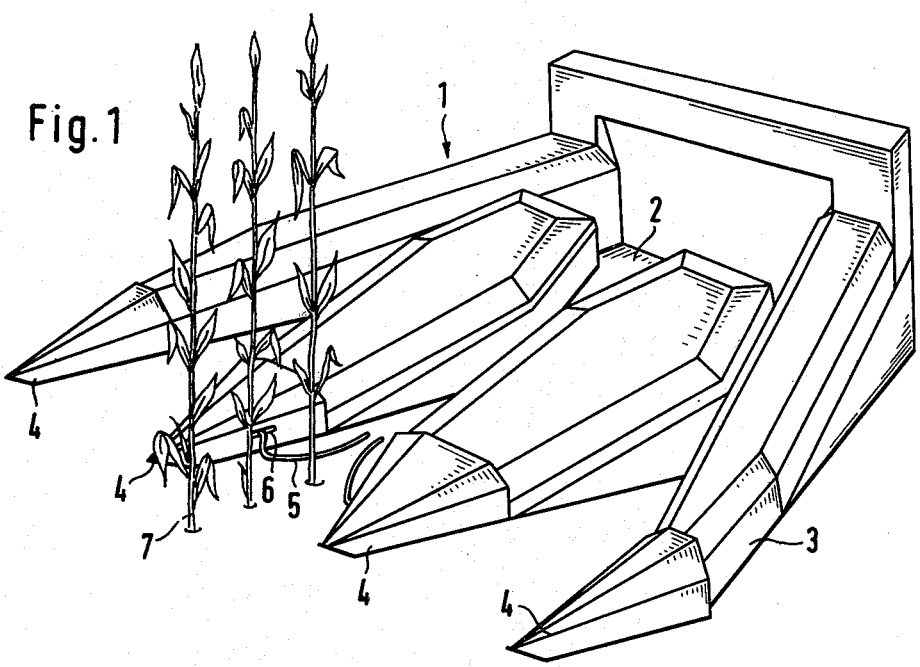
FIG. 1 is a perspective illustration of the stalk divider of a maize reaper-type harvesting machine provided with sensing devices constructed in accordance with the present invention.

FIG. 1 illustrates a stalk dividing assembly 1 which is located on the front of a mechanism 2 (not illustrated in detail) which is employed for the gathering and cutting of plants on a self-propelled harvesting machine. The arrangement actually illustrated in FIG. 1 corresponds to that normally employed in a maize reaper. The stalk dividing assembly 1 has a row of divider points 3 which are located in spaced abreast relation to one another as illustrated, and as known per se, in generally coplanar relation to one another. The spacing of the dividers 3 corresponds to the spaces between the rows of the respective crop, e.g., stalks 7 of maize aligned in rows. With the particular assembly which has been illustrated in FIG. 1, three such rows of stalks can be simultaneously reaped as they are guided between dividers 3. Each divider has a casing 4 taking the form of two or more panels which encase, respectively, front and rear sections of each divider 3.

In order to guide the harvesting machine automatically along the rows of crops, a sensing means must be provided to control the automatic steering system (not illustrated) of the harvesting machine. In the arrangement of the present invention, the sensing means includes two feelers 5 of rod configuration, which are situated, for example, inside of the two middle dividers 3 of assembly 1 and which extend toward one another from the facing side walls of said two middle dividers 3.

One end of each feeler 5 is mounted inside of its associated divider 3, i.e., within the casing 4 of that divider 3, and each feeler extends from its interior end in a direction transverse to the direction of elongation of its divider casing and transverse to the direction of motion of the harvester machine, through an opening 6 in the side wall of the divider casing. Each opening 6 is preferably of elongated slot configuration, and the portion of the rod which comprises each feeler 5 is located, when the feeler is in a predetermined neutral position (to be discussed hereinafter), at a point which is spaced from both opposing ends of the associated slot 6. After emerging from slot 6, each feeler 5 is angled in a rearward direction and is given the configuration of a shallow convex arc which, in a preferred embodiment of the invention, corresponds to ⅛th of a circle.

The plane defined by the arcuate portion of each feeler 5 lies substantially parallel to the plane of motion of the divider assembly 1. Each feeler 5 is swingable in this plane, or at a slight inclination thereto, about a point of pivotal mounting of the feeler which is located within its associated divider 3. The rearwardmost end of each feeler comprises a free end which is positioned to the rear of the rearwardmost end of the opening 6 through which the feeler protrudes, so that rearward deflection or swinging motion of the feeler (as it is dragged along a stalk 7 during a sensing operation) is limited by abutment of the free end of said feeler on the exterior side wall of its associated casing 4. By means of this support arrangement, the stress on the feelers 5, when the feelers have been deflected rearwardly to their maximum desired extent, is advantageously reduced. Each feeler is also adapted to be deflected in a forward direction, i.e., forward of its neutral position and toward the forwardmost end of its associated slot 6, up to an angle of about 150° or more when the harvester machine is propelled in a reverse direction, as will be more fully described hereinafter.

The arcuate shape of the preferably rodlike feelers 5 exhibits the advantage that each feeler can simultaneously contact several stalks in a given row of crops. As a result, the feeler 5 does not jump from one stalk to another during a sensing operation, whereby unnecessary corrections of the automatic means guiding the steering of the harvester machine are avoided. The openings 6 in the casings 4 preferably take the form of elongated slots, to enhance the freedom of movement of the feelers 5 at their points of emergence from their associated divider casings 4. Slots 6 are located on the sides of the stalk dividers 3 and can, if desired, be inclined downwardly. The dimensions of the slots are chosen to provide sufficient space for the feelers so that movement of the feelers 5 within slots 6 produces a self-cleaning effect which keeps the slots clear of debris or the like, thereby eliminating the danger that the feelers 5 can become jammed in their respective slots 6.

In the arrangement shown in FIG. 1, the two feelers 5 are in their neutral operating positions. In that position, no steering correction occurs as the rearwardly extending feelers 5 move along individual stalks 7 in a row of plants, since the arcuate portions of the two feelers are so arranged that they are disposed symmetrically and in spaced relation to one another on opposite sides of the row of plants with the minimum distance between the two feelers being sufficiently large to permit each feeler to pass the individual stalks 7 without touching them. As a result, only one of the two feelers can engage the stalks 7 at any given time and the automatic steering system of the harvester is thus supplied with a control signal from the transducer associated with only one of the feelers at any given time.

FIG. 2a shows the positioning of one of the feelers 5 in its said neutral operating position. The casing 4 of the divider 3 has been cut away from below in the illustration to permit the underside of the entire arrangement to be viewed. The mounting structure employed for the swingable feeler 5 is carried on a stationary supporting structure or element 8, under which a hub member 9 is rotatably mounted about an axis 10. The hub member 9 includes a housing 11 which (as will be described subsequently by reference to FIG. 3) contains a transducer forming a portion of an electrical measuring system, and also contains a return spring which normally urges the feeler 5 toward its neutral position. Electrical signals generated by the transducer are coupled to the automatic steering system via a junction box 12 which is secured to the stationary carrier plate 8.

The rotatable mounting of hub member 9 permits the principal sensing motion of the feeler 5 in its operating position. The feeler 5 could, therefore, be rigidly secured to the hub member 9 in the arrangement shown in FIG. 2a. Instead of using this particular type of assembly, however, advantages are achieved by a pivotal interconnection between the feeler 5 and the front end of the hub element 9 at a pivot 13. A cam 14 is attached to the innermost end of feeler 5 about the pivot 13. Cam 14 extends beyond the hub member 9 and, in the neutral operating position of the mechanism, lies against an abutment 17 which preferably takes the form of a roller, and which cooperates with other elements of the mechanism to be described to determine the neutral positions of the rotatable hub member 9 and of the swingable feeler 5.

A return spring 23 (see FIG. 3) is located within housing 11 of the hub member 9, and operates to rotate the hub member 9 in a direction toward abutment 17. Cam 14 has a curved camming surface 16 on its circumference which is eccentric to the feeler pivot 13, and which rides on the abutment 17. Since the point of contact between eccentric camming surface 16 of the cam 14 and the abutment 17 is farther from the axis 10 of the hub member 9 than is the feeler pivot 13, the force of the return spring 23 in the hub member 9, when the cam 14 is in contact with abutment 17, effects a turning moment on the feeler 5 which attempts to rotate the feeler 5 in a direction opposite to the return motion of the hub member 9.

In order to establish the operating position of the feeler 5 in relation to the hub member 9, feeler 5 is provided with a supporting lug 18 on one side thereof adapted to separably engage the hub member 9 at a position between the two pivot axes 10 and 13. When the feeler 5 is deflected in a rearward direction relative to its neutral position, the engagement of lug 18 with hub member 9 (see FIG. 2b) causes feeler 5 and hub member 9 to rotate as a unit about axis 10. The axis 10 is the measuring axis on which the transducer of the measuring system (to be described) is located, i.e., between the hub member 9 and the carrier plate 8, so that said transducer generates an appropriate control signal which is determined by the instantaneous angle of the hub member 9 about its pivot 10.

If, on the other hand, a force should be applied to feeler 5 which overcomes the return force of spring 23, the supporting lug 18 moves out of engagement with hub member 9, and feeler 5 can be swung in a forward direction about its pivot 13 (see FIG. 2c), with the hub member 9 remaining substantially in its neutral position, until a flat 15 adjacent the eccentric camming surface 16 on the cam 14 contacts the abutment 17 and/or until the feeler 5 contacts a further abutment 19 at the forward end of the slot 6 through which the feeler 5 protrudes.

The feeler 5 and the hub member 9 are preferably movable in the same plane, and the axis 10 of the hub member 9 is preferably parallel to the pivot axis 13 of the feeler 5. The double swinging motion which is made possible by the feeler mounting arrangement has the following purpose:

During sensing of the stalks 7 in a row of plants by the feeler 5, deviation from the intended course must, as mentioned previously, create a control signal which is a function of the angle to which the transducer is moved by deflection of feeler 5 and hub member 9. The transducer is intended to be operative during an arc of motion which is defined by the neutral position (FIG. 2a) of the mechanism at one end thereof, and by abutment of the free end of the feeler 5 on the casing 4 of divider 3 at its other end. Whenever the feeler 5 and hub member 9 are rotated as a unit within this operating arc the desired signal is generated and, upon removal of the force which is applied by stalks 7 to feeler 5, the feeler 5 and hub member 9 are returned to their neutral positions by the return spring 23. However if the direction of motion of the harvesting machine should be reversed, it is important to assure that the feeler 5 and its associated measuring system will not be damaged; and the feeler 5 is therefore adapted to swivel in a forward direction under these circumstances by the arrangement described. As long as the eccentric camming surface 16 of the cam 14 rides on abutment 17, the return spring 23 operates as described above to return the feeler 5 to its neutral position. If, however, the flat 15 on the cam 14 engages the abutment 17, feeler 5 remains in its forward position (FIG. 2c) and is returned to its neutral position (FIG. 2a) only when it meets opposition during subsequent forward motion of the harvest machine. This arrangement, in addition to eliminating possible damage to the feeler, has also proved to be useful in connection with servicing and cleaning of the divider of the machine since the feeler 5 can readily be moved to and retained in its forward position thereby to allow access to regions which would otherwise be blocked by the feeler.

It will be noted from FIG. 2a that feeler 5 may be moved to a certain extent in a direction forward of the neutral position while the camming surface 16 continues to ride on the abutment 17; and when this limited forward movement occurs, a moderate return force is still applied to the forwardly deflected feeler to return it to its neutral position. However when the forward deflection of feeler 5 is of sufficient extent to cause the flat 15 to engage abutment 17, the return moment produced by spring 23 is zero. Should an extreme forward deflection of the feeler 5 occur, however, i.e., to an extent such that feeler 5 contacts the abutment 19 at the forward end of slot 6, the return force again becomes considerable. This peculiarity of the mechanism is indicated in FIG. 2c. When the feeler 5 is in contact with abutment 19, further deflection of the feeler in a forward direction causes the feeler 5 to shift the hub member 9 out of its neutral position, so that the return force of spring 23 is increased. Because of the abutment 19, the feeler 5 and hub member 9 form a kind of toggle lever so that, on the one hand, the feeler 5 can yield to high resistance when the direction of motion of the harvesting machine is reversed and, on the other hand, the feeler 5 always springs back into its forward position in which the moment of force is ineffective. Thus, at the end of any reverse movement of the harvesting machine, the feeler 5 always returns to a forwardly angled position from which it will be pushed back by rearwardly directed resistance encountered when the harvesting machine is subsequently driven forwards. The driver of the harvesting machine is thus completely relieved of the problem of correctly setting the feelers 5 relative to a row of plants.

Figure 3:
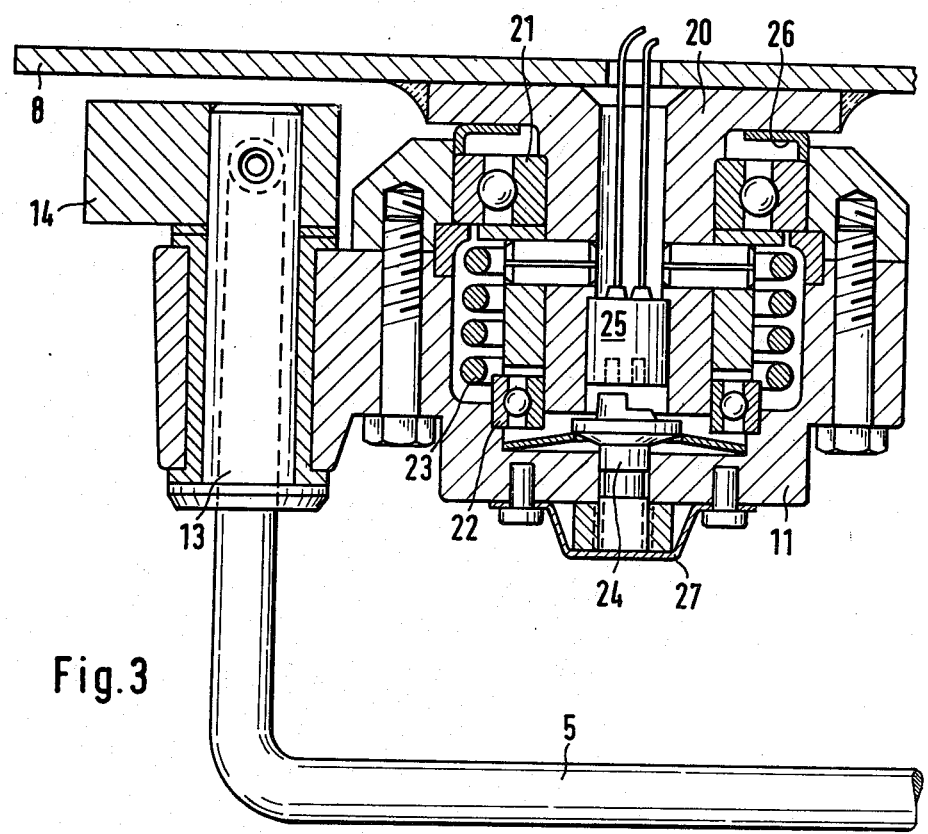
FIG. 3 is a section taken on line III—III of FIG. 2a through the feeler bearing of a sensing device constructed in accordance with the present invention.

FIG. 3 shows the preferred arrangement employed for return spring 23 and the transducer of the electrical measuring system within the housing 11 of the hub member 9. The housing 11 is of cup-shape, has its open end facing carrier plate 8 and cooperates with a bearing flange 20 that is secured to the carrier plate 8 and extends into the open end of housing 11. The housing 11 and hub member 9 are rotatably mounted on the bearing flange 20 by means of bearings 21 and 22, and an associated sealing system 26 completely seals the inside of the housing 11 regardless of its angular position. The return spring 23 is located between bearing flange 20 and the housing 11 and, in the neutral position of hub member 9, is already pre-stressed.

The electrical measuring system comprises a transducer which includes a stationary magnetic field generating member 25 which is situated at the center of the bearing flange 20 of carrier plate 8. Member 25 is fixed in position and can be energized via electrical leads as shown in FIG. 3. The transducer also includes a magnetic core 24 which is disposed adjacent to but spaced from member 25, and which is attached to hub member 9 for rotation therewith. Magnetic core 24 is so flattened on one or both sides thereof that it provides a symmetrical flux path for field member 25 only when hub member 9 is in its neutral position. However, upon rotation of the magnetic core 24 together with hub member 9, the resultant asymmetry of the magnetic field effects a change in the reluctance of the field member 25 which is related to the angle of rotation of hub member 9. A removable cap 27 is provided on the housing 11 to facilitate adjustment of magnetic core 24 to its neutral position on hub member 9.

Having thus described our invention, we claim:

1. In an agricultural machine of the type having an automatic steering system for guiding said machine along rows of plants, said machine being provided with at least one feeler adapted to sense the location of plants in one of said rows to control said automatic steering system, and said machine also including a plant harvesting mechanism at the front end thereof cooperating with a plurality of spaced forwardly extending elongated casings comprising dividers which separate adjacent plant rows from one another as said machine moves in a forward direction along said rows during a plant harvesting operation, the improvement wherein two adjacent ones of said divider casings include a pair of elongated slots in the facing side walls thereof, respectively, a pair of feelers extending respectively from said two adjacent divider casings through the elongated slots in said casings in opposed relation to one another on opposite sides of the plants in said one of said rows, each of said feelers comprising a rod having one end thereof mounted for pivotal motion within its said casing, a transducer for each of said feelers located within the casing associated with said feeler adjacent said pivotally mounted one end of said rod and responsive to pivotal movement of said one end of said rod within its said casing for generating a control signal for said automatic steering system, said rod for each of said feelers extending from the interior to the exterior of its said casing through the elongated slot in said casing in a direction transverse to the direction of elongation of its said casing, the exterior portion of each of said rods extending from its said elongated slot in a rearward direction relative to said machine to a position rearward of the rear end of said slot and being curved into a comparatively shallow, convex arcuate configuration which bows outwardly from said side wall of the divider casing in which said rod is pivotally mounted to cause said rod to contact simultaneously at least two of the stalks in said one of said plant rows when said control signal is to be generated.

2. The structure of claim 1 wherein the exterior free end of each of said rods is located rearwardly of the elongated slot through which said rod extends for selective engagement with the said side wall of its said casing to define a limit position to which said rod may be deflected relative to its said casing during a plant location sensing operation.

3. The structure of claim 1 wherein said arcuate configuration constitutes, for each of said feeler, substantially one-eighth of a circle.

4. The structure of claim 1 wherein the arcuate portions of said two rods are substantially coplanar with one another, the closest adjacent portions of said two rods being spaced from one another by a distance sufficiently large to permit only one of said rods to engage the plants in said one of said rows at any given time to control said automatic steering system.

5. The structure of claim 1 wherein each of said feelers includes a fixed supporting structure within its said divider casing, and a hub pivotally mounted on said supporting structure, said one end of said rod being secured to said hub.

6. The structure of claim 1 wherein each of said pair of feelers includes spring means located within its said casing and coupled to its said hub for resiliently urging said hub and the rod secured thereto toward a predetermined neutral position.

7. The structure of claim 6 wherein each of said pair of feelers includes an abutment on its said supporting structure cooperating with its said spring means for defining said neutral position.

8. The structure of claim 5 wherein the transducers for said pair of feelers are located respectively within said casings between the said fixed supporting structure and the said hub in each casing.

9. The structure of claim 8 wherein each of said transducers comprises a magnetic field producing element and a magnetic core element located adjacent to one another in spaced relation, one of said elements being fixed in position on said supporting structure and the other of said elements being mounted on said hub for movement with said hub.

10. The structure of claim 6 wherein, for each of said feeler said one end of said rod is pivotally attached to said hub at a point on said hub spaced from the pivotal axis of said hub, whereby said rod is adapted to be pivoted on said hub in a forward direction relative to its said predetermined neutral position.

11. The structure of claim 10 including, for each of said feeler, a lug extending from said rod for engagement with said hub to effect pivotal motion of said hub about its pivotal axis when said rod is moved in a rearward direction relative to said predetermined neutral position.

12. The structure of claim 11 wherein, for each of said feeler, said one end of said rod includes a cam movable therewith, said cam including a camming surface which is eccentric to the point of pivotal attachment of said rod to said hub, and an abutment carried by said supporting structure, said abutment engaging said camming surface and cooperating with said spring means for defining said neutral position.

13. The structure of claim 12 wherein for each of said feeler, said camming surface is of curved configuration, said cam also including a flat surface spaced from said curved camming surface for engagement with said abutment when said rod is moved in a forward direction relative to said neutral position.

14. The structure of claim 12 wherein, for each of said feeler, said abutment is a roller.

15. The structure of claim 10 wherein, for each of said feeler, the forwardmost end of said slot comprises an abutment operative to limit the extent to which said rod may be moved in said forward direction.

* * * * *